Sept. 2, 1930.  A. ALDRICH  1,774,624
BALANCED STEAM JOINT
Original Filed Dec. 15, 1923
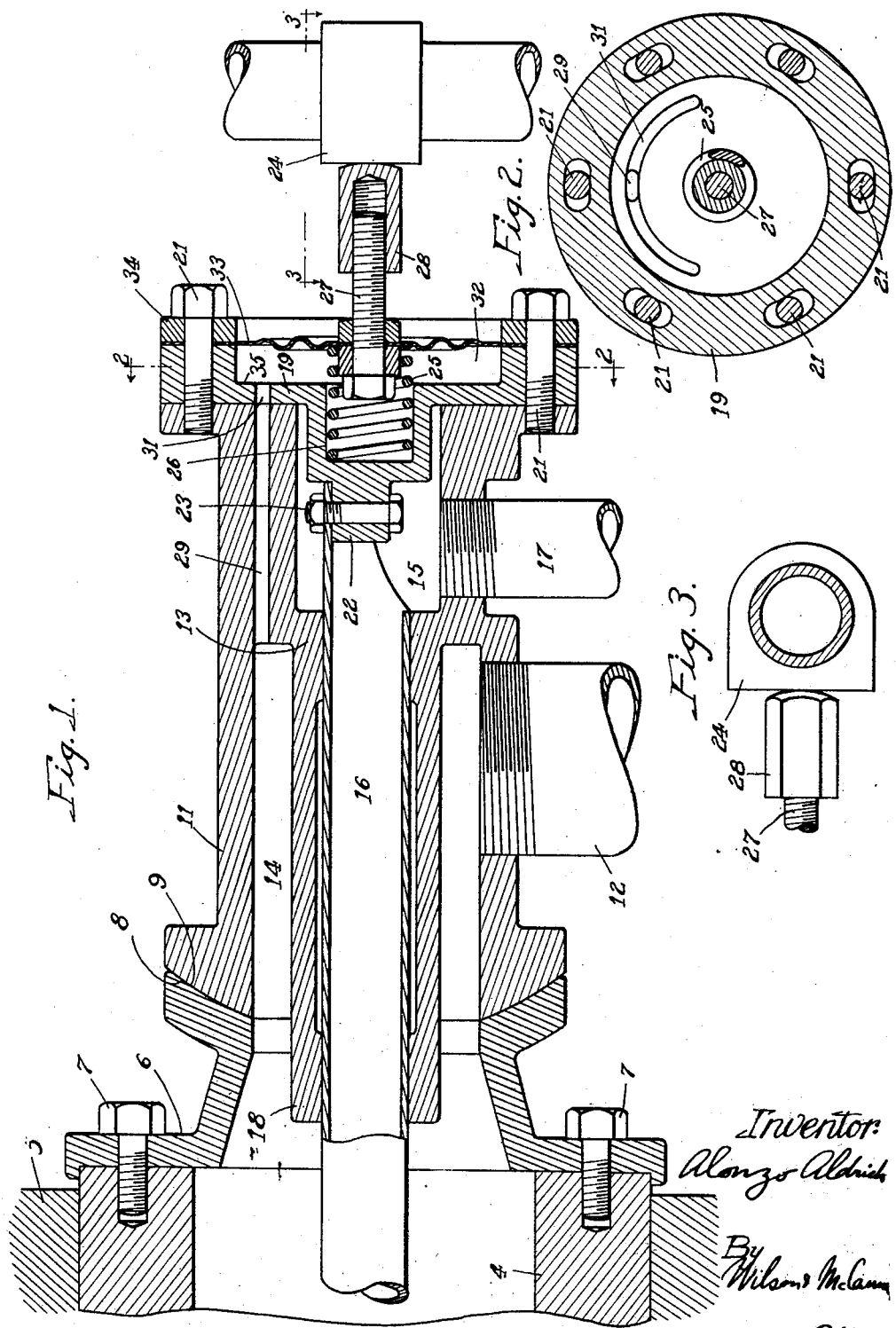

Patented Sept. 2, 1930

1,774,624

UNITED STATES PATENT OFFICE

ALONZO ALDRICH, OF BELOIT, WISCONSIN, ASSIGNOR TO BELOIT IRON WORKS, OF BELOIT, WISCONSIN, A CORPORATION OF WISCONSIN

BALANCED STEAM JOINT

Continuation of application Serial No. 680,818, filed December 15, 1923. This application filed November 24, 1924. Serial No. 751,943.

This application is a continuation of my copending application Serial No. 680,818, filed December 15, 1923 and is substituted therefor.

My invention relates in general to bearing joints between rotating and non-rotating parts of a conduit carrying fluid under pressure; and the primary purpose is to provide improved means for maintaining a fluid-pressure-tight and low friction joint between the rotating and non-rotating parts. That is, I have aimed to maintain a bearing joint between said parts which will not allow escape of the fluid under variations or fluctuations in the pressure thereof and in which comparatively low friction will be imposed between said parts so that the wear is reduced to a minimum.

While my invention is applicable to conduits handling fluids of various kinds it is, in the present case, applied in a steam line or conduit including a rotary element, so that it becomes necessary to maintain a proper joint between the rotating and non-rotating parts.

More particularly, in the present application it is an object of my invention to provide an improved steam joint in the journal bearing of a steam heated drying cylinder of a paper drying machine or any machine employing steam or any fluid pressure, said joint being so constructed that the required pressure between the cylinder journal and the complemental bearing part is regulated or determined by an adjustable spring mechanism and is automatically maintained substantially at said determined pressure regardless of variations in the pressure within the cylinder.

Another object of this invention is to provide a bearing at the journal of a steam heated cylinder wherein the pressure of the steam within the cylinder or conduit acts to maintain an approximately fixed pressure between the bearing parts.

Still another object is to provide in connection with a bearing joint of the character described a diaphragm mechanism for maintaining the pressure between rotating and non-rotating parts substantially constant for a set adjustment of a pressure determining means.

My invention in its broader aspect contemplates the provision of a practical balanced joint, that is, one in which a steam or other fluid tight joint is maintained between a rotating and a non-rotating part without undue friction and regardless of variations in the steam or fluid pressure.

It is also an important object of this invention to provide an improved balanced joint between a cylinder journal and its bearing member, said joint being of simple and effective construction and being provided with adjustable means for affording a definite pressure between the bearing parts sufficient to keep the joint steam tight, said pressure being maintained approximately constant by a balanced pressure arrangement governed by the pressure within the cylinder or conduit but independent of variations in said pressure.

Other objects and attendant advantages will be appreciated by those skilled in this art as the invention becomes better understood by reference to the following description when considered in connection with the accompanying drawings, in which—

Figure 1, is a vertical, longitudinal, sectional view through a balanced steam joint as applied to the journal of a paper drying machine drying cylinder, embodying the principles of this invention; and Figs. 2 and 3, are detail sectional views taken on the lines 2—2 and 3—3, respectively, of Fig. 1.

While my invention in its broader aspect is applicable to any bearing joint between a rotating and a non-rotating part of a fluid pressure conduit, it is illustrated herein as applied to the joint or fitting between a steam supply conduit and a hollow rotary journal of a drying cylinder such as is used in a paper drying machine. Inasmuch as this general organization of parts is well known in the art I deem it necessary to illustrate only the end of a journal to which the steam conduit connects.

The journal indicated by reference numeral 4 rotates in a suitable supporting bearing 5. In this case a journal ring 6 rigidly secured to the journal by bolts 7 provides a concave or spherical surface 8 which constitutes the rotating part or surface of the joint. It should be noted, however, that my invention is not confined to the use of a concave or spherical surface 8, but that this surface might be of any suitable shape, that shown being well known in this art and desirable in some instances due to the particular mounting and construction of the steam conduit or fitting. In the present case the spherical surface accommodates a certain degree of displacement between the steam fitting parts and the journal occasioned by conditions incidental to usage as is well understood in this art and which might be accommodated or otherwise provided for within the scope of the present invention.

Against the rotating surface 8 is held a complemental bearing surface or part 9 making a bearing joint therewith, said surface 9 being in this instance the terminus of a steam supply conduit composed of several parts. In this case the conduit comprises, generally stated, a bearing member designated generally by 11 in the form of a sleeve or housing of substantially tubular form in cross-section and a steam supply pipe 12 threaded into the under side of said member, the pipe 12 being connected by suitable fittings, not shown, to a steam line.

Provision is made for a condensate siphon passing through the steam supply conduit, whereby condensate from within the cylinder is discharged. In this case the conduit member 11 is divided by a transverse partition 13 into a steam compartment 14 and a condensate compartment or chamber 15. The condensate siphon comprises pipes 16 and 17 emanating from the chamber 15, the former being supported concentrically within and by the bearing member 11, as by a sleeve 18 integral therewith, and extending through the journal 4 and to a low point in the drying cylinder as is well known in this art, and the latter being threaded into the underside of the bearing member 11 so as to communicate with the chamber 15 and provide a condensate outlet or discharge pipe. The outer end of the condensate chamber 15 is closed by a plate 19 secured in place on the member 11 by screw bolts 21. In this instance the outer end of the pipe 16 is attached to an inward projection 22 on the closure plate 19 by means of a bolt 23. From the foregoing it will be manifest that the steam and condensate compartments or chambers are separated one from another by a suitable intervening structure.

With the construction thus far described it will be apparent that the steam pressure in the cylinder and in the steam supply conduit will exert a force tending to move the bearing member 11 or conduit away from the journal and separate the bearing parts between the terminus of said conduit and the journal. My invention contemplates the provision of adjustable means for resisting this force and whereby a determined contact or bearing pressure will be exerted by the surface 9 against the surface 8 to effect a steam-tight bearing joint therebetween, and likewise contemplates the provision of suitable means for effecting a balance in the action of the steam pressure against the bearing member 11 or steam supply conduit, whereby an approximately fixed or constant pressure between said bearing parts is maintained regardless and independently of variations in said pressure. In the present exemplification of my invention said outward force of the steam pressure tending to separate the bearing joint is resisted by suitable rigid and stationary means shown herein as a stationary member 24. The means to this end acting between the bearing member 11 and stationary member 24 comprises a coiled compression spring 25 seated at one end within a locating recess 26 formed in the closure plate 19 and suitably connected at its opposite end to bear against a screw 27 coaxial with the spring and threadedly engaged in a thrust bearing nut 28 which bears against the stationary member 24. It will be apparent that by adjustment of the nut 28 the spring 25 may be put under such compression as to exert a force which will counteract the outward force of the steam pressure above-mentioned and hold the surface 9 of the bearing member 11 seated against the rotating surface 8 with sufficient pressure to maintain a steam tight joint.

Supplemental to the provision of suitable pressure-exerting means for providing a determined pressure between the bearing parts my invention contemplates the provision of suitable means responsive to the steam pressure and through the agency of which the bearing pressure is maintained approximately fixed or constant regardless and independently of variations in the steam pressure. In other words I have provided a means whereby a balanced effect is produced in the steam fitting so that variations or fluctuations in the steam pressure do not materially affect the bearing joint either as to increasing or decreasing the contact pressure between the rotating and non-rotating parts. This is accomplished in the present construction by admitting steam from the steam compartment 14 through a passage 29 in the member 11 and a registering opening 31 in the closure plate 19 to a diaphragm compartment or chamber 32 formed by said closure plate and a metal diaphragm 33 having a fixed connection at its center with the screw 27, the diaphragm being marginally clamped to said closure plate by a retaining ring 34 and the bolts 21 above-mentioned. Inasmuch as the diaphragm compartment 32 is at least equal in diameter to the steam compartment 14, the effective steam pressure longitudinally of the conduit at opposite sides of the closure plate 19 or rather, the pressure toward the plate at the partition wall 13, and the pressure toward the partition wall at the plate, will be balanced. In other words the pressure outwardly against said closure plate will be balanced by an equal pressure inwardly against said plate; and inasmuch as the diaphragm provides a flexible or movable connection between the stationary member and the bearing member or conduit 11, the latter will be active and responsive to the pressure of the spring 25. It follows, therefore, that said spring or pressure-exerting means will maintain a determined or an approximately fixed pressure between the bearing parts regardless of variations in the steam pressure, which variations are balanced by reason of the diaphragm mechanism or structure. It will be noted that the pressure-exerting means is rendered operative through the agency of the flexible diaphragm. It will also be noted that I have provided a construction in which both the longitudinal and radial forces of the steam are balanced, the longitudinal force tending to separate the bearing joint being resisted by a stationary or fixed means, and that provision is made whereby one of the bearing parts (in this case the non-rotating part) is responsive to a pressure-exerting means independently of variations in the steam pressure. Furthermore, the pressure exerted for maintaining a steam tight joint may be applied by any suitable expedient. At present both spring and steam or fluid pressures are used, the spring pressure being applied by the spring 25 and the fluid pressure by the action of the steam against the annular surface 35. In the latter case it will be observed that the diaphragm compartment 32 is of greater diameter than the steam compartment 14, thereby providing a surface 35 which is responsive to and acted on by the steam pressure to urge the bearing member 11 against the journal, this force being supplemental to the spring pressure.

In this case the opening 31 is arcuate as shown in Fig. 2 to maintain registration with the passage 29 when the closure plate 19 is adjusted rotatably about its center axis for the purpose of changing the position of the inner end of the condensate pipe 16 in the drying cylinder, for reasons known in this art.

It should be expressly understood that the term "steam" as used in the claims means any fluid, and that the invention defined by the claims may be applied with such other fluid.

It is believed that the foregoing conveys a clear understanding of the objects and principles of my invention prefaced above. I am aware that many changes may be made and numerous details of construction may be varied through a wide range without departing from the principles of this invention, and I therefore do not propose limiting the patent granted hereon, otherwise than necessitated by the prior art.

I claim as my invention:

1. A balanced steam joint comprising a journal member, a bearing member contacting the same, an apertured closure for said bearing member, a diaphragm secured to said closure, a screw secured to said diaphragm, a stationary member, a spring between said closure and said diaphragm, and a thrust nut on said screw adapted to be adjusted thereon to contact said stationary member to hold the bearing member against the journal member.

2. A balanced steam joint comprising a rotatable member, a journal thereon, a stationary member, a bearing member engaging said journal, a recessed closure plate secured to one end of the bearing member and having an aperture therein, a diaphragm secured to one end of said bearing member, a spring between said closure plate and said diaphragm, a screw secured to said diaphragm projecting outwardly therefrom, and a thrust nut adjustable on said screw and contacting said stationary member.

3. The combination with a hollow rotatable journal, a bearing member contacting said journal, partitions in said bearing member dividing the interior into a steam inlet chamber and a condensate outlet chamber, a steam supply pipe conected with said steam inlet chamber, a condensate outlet pipe connected with said outlet chamber, a condensate outlet tube leading through the journal and projecting into said condensate outlet chamber, an apertured and recessed closure plate secured to the end of said bearing member, a diaphragm closing said recessed plate, a spring between said recessed plate and said diaphragm, a screw secured to said diaphragm, a stationary member, and a thrust nut adjustable on said screw and contacting said stationary member.

4. The combination with a hollow rotatable journal, a bearing member adapted to seat against the end of the journal, partitions in said bearing member dividing the interior into a steam inlet chamber and a condensate outlet chamber, a steam supply pipe connected with said steam inlet chamber, a condensate outlet pipe connected with said outlet chamber, a condensate outlet tube leading through the journal and projecting into said condensate outlet chamber, an apertured recessed closure plate secured to the end of said bearing member and to said condensate outlet tube, a diaphragm secured to said recessed plate, a spring between said recessed plate and said diaphragm, a screw secured to said diaphragm, a stationary member, and a thrust nut adjustable on said screw and contacting said stationary member.

5. The combination with a hollow rotatable journal, of a bearing member therefor, a diaphragm mechanism closing one end of the bearing member, means connected therewith for adjusting the diaphragm mechanism, and a condensate remover in said cylinder projecting through the bearing member and connected with said diaphragm mechanism.

6. In combination, a rotatable member having a hollow journal, a supporting bearing for the journal, a steam supply fitting having a bearing member adapted to seat against the end of the rotatable member, said fitting being freely movable with respect to the journal bearing to accommodate displacements during service, said fitting including means acted on by the steam pressure for urging said bearing member against the rotatable member, and means stationary longitudinally with respect to the journal bearing for resisting the action of the steam pressure against the fitting.

7. The combination with a hollow rotatable journal, of a bearing member therefor, a diaphragm closing one end of the bearing member to afford a balanced pressure arrangement for the journal and bearing member, and means connected with the diaphragm for adjusting the diaphragm and also determining and maintaining the pressure between the bearing member and said journal sufficient to obviate leakage of steam from between the bearing member and said journal.

8. The combination of a hollow rotary journal, a stationary member spaced from the end of said journal, a steam supply conduit interposed between the fixed member and journal to deliver steam through the latter, a joint between a rotating part and a non-rotating part connecting said journal and conduit, said parts being so positioned that the tendency of the steam pressure in the conduit is to separate them, pressure-exerting means operating between said stationary member and said conduit to urge said rotating and non-rotating parts into contact for effecting a steam tight joint, and means whereby the steam pressure in the conduit acts supplemental to said pressure-exerting means to urge the said rotating and non-rotating parts into contact.

9. In combination, a hollow rotatable member, a supporting bearing for said member having a fixed mounting, a non-rotatable steam fitting having a bearing member at one end adapted to seat against an end of said rotatable member, the steam pressure in the fitting exerting a force tending to move the fitting and its bearing member away from the rotatable member, means fixed longitudinally with respect to said supporting bearing for resisting said force, said fitting having means responsive to the steam pressure and acted on thereby to urge said bearing member against the rotatable member for maintaining a steam tight joint, said fitting being free to move with respect to said supporting bearing and the said fixed means to accommodate displacement during service without disturbing the said joint.

10. A balanced steam joint comprising a journal member, a bearing member contacting the same, an apertured closure for said bearing member, a diaphragm secured to said closure, a stationary member spaced with respect to said closure, and adjustable thrust means between said stationary member and said diaphragm.

11. A joint of the character described comprising a journal member, a bearing member contacting the same on the end thereof, a resilient element bearing against said bearing member, a stationary member spaced with respect to said bearing member, and adjustable thrust means between said bearing member and said stationary member to vary the tension of said resilient element.

12. A joint of the character described comprising a journal member, a bearing member engaging the end thereof to have a steam tight joint, a resilient diaphragm element bearing against said bearing member and subject to the pressures existing therein, a stationary member spaced in relation to said bearing member, and adjustable thrust means between said bearing member and said stationary member whereby to urge said bearing member toward said journal member and to vary the tension of said resilient diaphragm element.

13. A joint of the character described comprising a journal member, a bearing member engaging the end thereof, spring means acting against said bearing member to hold the same in engagement with said journal member, a stationary member spaced with respect to said bearing member, and adjustable thrust means between said spring means and said stationary member serving to back up said spring means and to vary the spring pressure on said bearing member, said bearing member having a partition wall therein intermediate the ends thereof provided with a passage establishing communication between the opposite sides thereof, said spring means being arranged on the rear side of said partition wall, and said bearing member having a diaphragm permitting steam from said journal in front of said wall to coact with the latter to result in a balanced pressure between said journal and said bearing.

14. In combination, a rotary hollow journal, a supporting bearing for the journal, a steam supply conduit, a steam fitting between said journal and conduit, said fitting having at one end a bearing member adapted to fit against the end of the journal, the pressure of the steam tending to force the fitting away from the journal, said steam supply conduit and said steam fitting constituting a unit capable of movement with respect to the journal bearing to accommodate displacements during service, a flexible diaphragm acted on by the steam pressure in the fitting, and means providing a stationary resistance for the fitting opposing said force of the steam whereby the bearing of the fitting, will be urged against the journal.

15. In combination, a rotary hollow journal, a supporting bearing for the journal, a steam supply conduit, a steam fitting provided with a bearing member adapted to have end thrust bearing against the end of said journal, said steam supply conduit and steam fitting constituting a unit capable of movement with respect to the journal bearing to accommodate displacement during service the tendency of the steam pressure being to force the fitting away from the journal, means stationary longitudinally with respect to the journal bearing connected with the fitting for resisting said force, and means whereby the steam pressure in the fitting is utilized for governing the pressure of the bearing member against the journal.

16. In combination, a rotary hollow journal, a supporting bearing for the journal, a steam supply conduit, a steam fitting fixed to the conduit and having a bearing joint against the end of the journal, said fitting and steam supply conduit constituting a unit having capacity for lateral movement with respect to the journal bearing to accommodate displacements during service, said elements being so arranged that the pressure of the steam tends to force the fitting away from the journal, and means providing a stationary resistance for the fitting opposing said force, the fitting including means acted on by the steam pressure for urging its said bearing against the journal.

17. In combination, a rotary hollow journal, a supporting bearing for the journal, a steam fitting equipped at one end with a bearing member adapted to seat against the end of the journal, the fitting having a steam passage and a condensate passage, a steam and a condensate pipe connected to the steam and the condensate passages, respectively, said fitting and pipes constituting a unit having capacity for movement with respect to the journal to accommodate lateral displacements during service, the tendency of the steam pressure within the fitting being to force it away from the journal, means stationary longitudinally with respect to the journal bearing for resisting said force, and means acting between said stationary resistance and the bearing member and acted on by the steam pressure within the fitting for urging said bearing member against the journal.

18. In combination, a rotary hollow journal, a supporting bearing for the journal, a steam fitting equipped at one end with a bearing member adapted to seat against the end of the journal, the fitting having a steam passage and a condensate passage, a steam and a condensate pipe connected to the steam and the conduit passages, respectively, said fitting and pipes constituting a unit having capacity for movement with respect to the journal bearing to accommodate displacements during service, the tendency of the steam pressure within the fitting being to force it away from the journal, a flexible diaphragm acted on by the steam pressure within the fitting, and means stationary longitudinally with respect to the journal bearing for resisting said force, whereby said pressure will be utilized for urging the said bearing member against the journal.

19. In combination, a hollow rotary journal, a supporting bearing for the journal, a steam fitting equipped at one end with a bearing member adapted to seat against the end of the journal, a steam supply pipe fixedly connected to the steam fitting, said fitting and pipe constituting a unit having capacity for movement with respect to the journal bearing to accommodate displacements transverse to the longitudinal axis of the journal during service, the tendency of the steam pressure within the fitting being to force it away from the journal, a flexible diaphragm acting between said stationary resistance and the bearing member and acted on by the steam pressure within the fitting, and means stationary longitudinally with respect to the journal bearing for resisting said force whereby said pressure will be utilized for urging the said bearing member against the journal.

ALONZO ALDRICH.